E. T. Covell,
Soldering Machine.
No. 107,458. Patented Sep. 20, 1870.
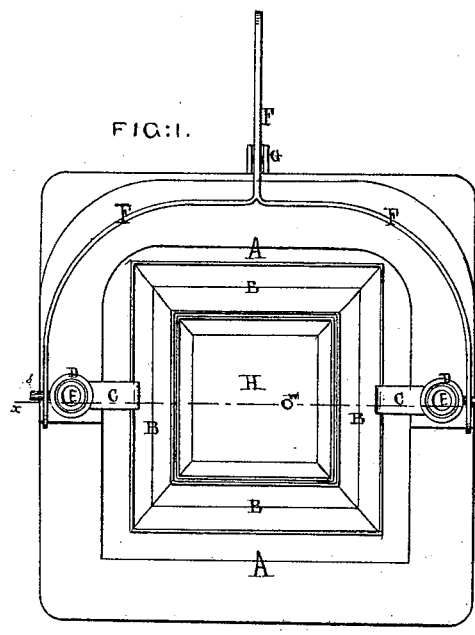
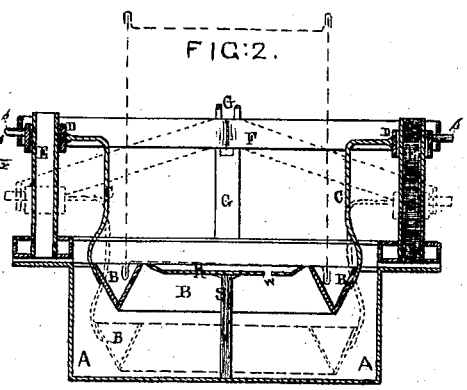
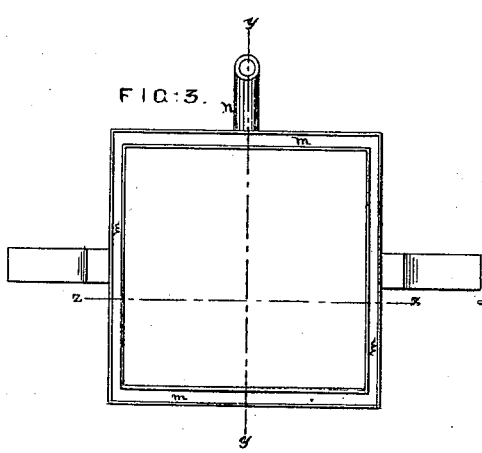
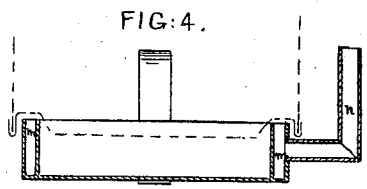
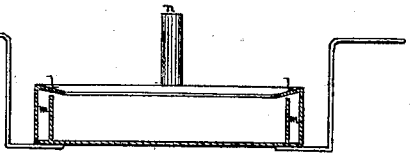
WITNESSES
H. H. Young
J. M. Burr.
Edward T. Covell, Inventor.
By David A. Burr
Atty.

United States Patent Office.

EDWARD T. COVELL, OF BROOKLYN, NEW YORK.

Letters Patent No. 107,458, dated September 20, 1870; antedated September 10, 1870.

IMPROVEMENT IN SOLDERING-MACHINES.

The Schedule referred to in these Letters Patent and making part of the same

I, EDWARD T. COVELL, of Brooklyn, in the county of Kings and State of New York, have invented certain new and useful Improvements in Machines for Soldering Tin Cans and other Metallic Vessels, of which the following is a specification.

The first part of my invention relates to the combination of a movable trough-shaped or grooved frame, inclosing an open central space, with a larger pan or vessel placed beneath the same, to contain molten solder, the frame being so arranged and supported as that it may be made to rise and fall in the vessel, the object of this feature of my invention being to combine the advantages incident to the employment of a groove or trough containing molten solder, in which to dip the seam of a vessel for the purpose of soldering it, with the advantages obtained by having a large body of molten solder for the same purpose.

Soldering-furnaces have been heretofore made with a channel, trough, or groove, to contain molten solder, formed about an open central space; but in these furnaces, the most expensive fuel, such as charcoal, is required, because of their peculiar construction.

Much solder is also wasted in dipping seams in the channels thereof, from the fact that any surplus forced over the edges falls into the fire or wastes in the ash-pit.

Again, the solder therein cannot be kept at a uniform temperature, because of the necessity of constantly adding cold solder to maintain the needed supply, and a larger quantity of fuel is consequently required than where the solder is melted and kept fluid in a large mass. But with my improved apparatus, constructed as hereinafter described, the solder, being all fused at once in an ordinary open pan or vessel, may be melted and kept hot upon any description of furnace, with any kind of fuel, hard coal being preferable for the purpose.

The solder is then dipped up by the grooved frame at a uniform temperature in every part thereof, and as the frame remains suspended over the solder-pan, when the seams to be soldered are immersed therein, any excess of solder forced out therefrom drops back into the pan, and is saved.

By combining a central stationary support with the open movable frame, so that the latter may be brought up to inclose or encircle the former, after a can has been placed thereon, the head seams, formed with a simple hooked joint, may be kept together until soldered by simple pressure upon the can.

The second part of my invention relates to the combination of an air-space with the edges or sides of a central support, whether it be fixed or movable, and with an upwardly-bent or curved tube, affording a free open vent or passage of air into and out of said space, to prevent the can from becoming fastened down upon the support by atmospheric pressure, because of the air-tight joint formed around the bottom thereof, by the immersion of its seams in the solder.

Heretofore, this end has been sought by combining vent-tubes with the bottom of the support, but, in such case, the tubes are apt to become choked by an overflow of solder.

In my invention, the air-chamber may be wholly protected, and the desired end is attained in a neater and more satisfactory manner.

The third part of my invention relates to the use of hollow bearings or guide-standards, either open at each end, or else filled with a suitable non-conducting material, in combination with the movable support or frame of a soldering apparatus, to serve as guides or ways in controlling the movements thereof, as a substitute for the solid metallic guide-bars or standards heretofore employed, the object of this part of my invention being to prevent the annoyance and disadvantage resulting from an overheating of said guides or ways.

In the accompanying drawing—

Figure 1 is a top or plan view of my improved soldering apparatus;

Figure 2, a vertical section thereof in the line $x\ x$ of fig. 1, with the movement of the dipping-frame, and the position of a can placed thereon to be soldered, illustrated by dotted lines;

Figure 3, a plan of my improved support, with its encircling air-space;

Figure 4, a vertical section in line $y\ y$; and

Figure 5, a similar section in line $z\ z$ of fig. 3, fig. 5 illustrating an additional feature or modification of my invention, not shown in fig. 4.

A is a pan or vessel, which may be placed upon any description of furnace, and in which a quantity of solder is to be melted, and kept in a state of fusion when the apparatus is in use. This pan or vessel A is made much larger in area than the bottom of the vessel to be soldered.

B is a frame, consisting of a V or U-shaped groove or trough of metal, disposed in a rectangular or circular form, about an open central space, the form and size of the frame being made to correspond with that of the ends of the vessels to be soldered, so that their projecting seams may easily enter the groove or trough.

This dipping-trough or frame B is made to move vertically in and over the vessel A, by means of any suitable mechanical appliances, so that it may be lowered to the bottom thereof, as indicated by dotted lines in fig. 2, and also elevated to a proper height above it to receive the seams of the vessel to be soldered.

In the form of apparatus illustrated in the accompanying drawing the frame B is provided with arms C C, projecting upwardly therefrom centrally on opposite sides thereof.

The upper ends of these arms are bent outwardly at right angles, and are secured in sleeves or rings D D, which fit over and slide easily upon vertical standards E E, secured centrally to the sides or edges of the solder-pan A, as illustrated in fig. 2.

A lever, F, is pivoted to the upper end of a third standard, G, projecting vertically from the third side of the pan or vessel A, the inner arm of this lever being forked or divided, so as to extend on each side to the sleeves D D upon the standards E E, these inner ends being slotted longitudinally, to receive pins $s$ $s$, projecting from said sleeves D D, as shown in figs. 1 and 2.

The outer end of the lever projects sufficiently to receive the power necessary to elevate the frame, and which may be applied thereto, by means of a treadle connected therewith, or by any other mechanical device for the purpose.

By adding a weight to this outer end of the lever, to counterbalance that of the frame, its movements may be more readily effected.

By elevating the outer end of the lever F, thus arranged, it is evident that its inner arms will be forced down, carrying with them the slides D D, and, consequently, the frame B attached thereto.

The arms C C of the frame are so proportioned in length that the frame can be thus depressed to the bottom of the vessel A, or elevated to the plane of its upper edge.

The standards E E', forming bearings for the slides or sleeves D D, moving thereon, are made hollow, and either left open at each end, to admit of a constant current of air through them, so that they shall not become overheated in use, and the lubricating oil used thereon burned off, or else they may be filled with plaster of Paris, as shown at E', fig. 2, or other good non-conductor of heat, for the same purpose.

In operation, the vessel A is partially filled with molten solder, to a depth exceeding that of the depth of the trough or channel in the dipping-frame B.

The dipping-frame or trough B, immersed in the solder, and thus filled therewith, is then lifted, by means of pressure exerted upon the outer arm of the lever F, above the mass of solder, and held in place over it, while the seams to be soldered are dipped in the trough or channel of the frame.

Any solder which may be accidentally forced over the edges of the frame falls into the vessel beneath, and mingles with the molten mass therein, the heat whereof tends to retain the solder in the channel of the frame fluid.

A large number of seams may be thus dipped and soldered after each filling of the frame, before a second immersion thereof in the vessel beneath is required.

Joints which are double-seamed, or so formed as to be self secured, can be thus soldered by simply dipping them into the molten solder, without pressure, but where the seam is formed with a single hook-shaped joint, pressure against a support is required, to hold the head on while the seam is being dipped; otherwise the expansion of the edges under the influence of the heat will entirely separate and disconnect the seam. To operate, therefore, upon seams of this class, I combine a central stationary support with my improved movable dipping trough or frame B.

H represents the bed or body of this support, which is secured upon a central standard, S, projecting vertically from the bottom of the pan A. It is made of such size and form as to fit close against the bottom of the vessel, within the projecting seams at the edges thereof, (see dotted lines in figs. 2 and 4.)

The can to be soldered is placed upon this fixed support H, and then, by a movement of the lever F, the dipping-frame B, filled with solder, is brought up under its edges, so that the projecting seams become immersed therein, as illustrated in fig. 2. As, however, the immersion of the entire seam around the end of the can into the molten solder, forms an airtight packing around its edges, the atmospheric pressure upon the can must be overcome in lifting it off the support.

To avoid this trouble the bottom of the support H, where such support is fixed wholly above the mass of molten solder in the pan A, is simply perforated, as at $w$, figs. 1 and 2, to admit of the introduction of air under the bottom of the can; but where a support of deeper form is used, (as the form shown in figs. 4 and 5,) so that the bottom thereof is more or less immersed at times in the bath of molten solder in the solder-pan, or where the support is made movable, to be dipped into the solder, carrying the seams of the can thereon with it, I form the edges or sides of the support double, as illustrated in figs. 3, 4, and 5, so as to leave an air-space, $m$, entirely around it, with which a small tube or pipe, $n$, is connected, to afford a free vent for the air to and from the space, when it is covered over by the bottom of the can to be soldered.

In a machine having a movable dipping-frame, as illustrated in figs. 1 and 2, the vent-tube may be led down through the bottom of the solder-pan, but in a movable support it may be inserted in the side thereof, to project upwardly therefrom, as shown in fig. 4.

In either case the air-chamber may be protected from becoming filled or choked with solder by a projecting ledge, $l$, as shown in fig. 5.

I do not claim as new the combination of an air-tube with the support in a soldering apparatus, to admit air under the can placed thereon, my invention, in this respect, relating only to the improvement obtained by the double sides of the support, inclosing an air-space communicating with the atmosphere, independently of its opening at the top, by any suitable channel.

I claim as my invention—

1. The within-described movable dipping-frame B, combined with a pan or vessel, A, to contain molten solder, and arranged to be raised or lowered over and within the same, substantially as herein set forth.

2. The combination, as herein described, of an encircling air-space, $m$, having an outward vent independent of its upper opening, with the sides of a support for sustaining the bottoms of cans, or other vessels, during the operation of dipping their seams in molten solder, substantially as herein set forth.

3. A hollow guide or bearing-standard, E, left open at each end, for a passage of air through the same, and combined with the movable dipping-frame or support of a soldering apparatus, and with its solder-pan, substantially as and for the purpose herein set forth.

4. A hollow guide or bearing-standard, E', filled or lined with plaster of Paris, or other non-conductor of heat, and combined with the movable dipping-frame or support of a soldering apparatus, and with its solder-pan, substantially as and for the purpose herein set forth.

5. The lever F, combined with the dipping-frame B of my apparatus, to facilitate the elevation and depression thereof, substantially as herein set forth.

E. T. COVELL.

Witnesses:
THEO. F. JACKSON,
W. P. CROSBY.